(12) United States Patent
Jariwalla et al.

(10) Patent No.: US 9,309,412 B2
(45) Date of Patent: Apr. 12, 2016

(54) SILOXANE GRAFT CO-POLYMERS FOR MOLD RELEASE

(75) Inventors: Chetan P. Jariwalla, Woodbury, MN (US); Suresh Iyer, Woodbury, MN (US); Thomas P. Hanschen, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 163 days.

(21) Appl. No.: 13/881,127

(22) PCT Filed: Nov. 2, 2011

(86) PCT No.: PCT/US2011/058888
§ 371 (c)(1),
(2), (4) Date: Apr. 23, 2013

(87) PCT Pub. No.: WO2012/061457
PCT Pub. Date: May 10, 2012

(65) Prior Publication Data
US 2013/0224373 A1    Aug. 29, 2013

Related U.S. Application Data

(60) Provisional application No. 61/409,324, filed on Nov. 2, 2010.

(51) Int. Cl.
| | | |
|---|---|---|
| *C09D 5/00* | (2006.01) |
| *B29C 33/64* | (2006.01) |
| *C08G 77/442* | (2006.01) |
| *C08F 230/08* | (2006.01) |
| *B29K 96/02* | (2006.01) |
| *C08G 77/20* | (2006.01) |

(52) U.S. Cl.
CPC . *C09D 5/00* (2013.01); *B29C 33/64* (2013.01); *C08F 230/08* (2013.01); *C08G 77/442* (2013.01); B29K 2096/02 (2013.01); C08G 77/20 (2013.01)

(58) Field of Classification Search
None
See application file for complete search history.

(56) References Cited

U.S. PATENT DOCUMENTS

| | | |
|---|---|---|
| RE24,906 E | 12/1960 | Ulrich |
| 3,786,116 A | 1/1974 | Milkovich |
| 3,842,059 A | 10/1974 | Milkovich |
| 4,728,571 A | 3/1988 | Clemens |
| 5,004,646 A * | 4/1991 | Benham et al. ............... 428/344 |
| 5,176,975 A | 1/1993 | Kato |
| 5,395,721 A | 3/1995 | Kato |
| 5,405,691 A | 4/1995 | Noda |
| 5,594,067 A | 1/1997 | Doi |
| 5,851,674 A | 12/1998 | Pellerite |
| 6,376,065 B1 | 4/2002 | Korba |
| 2002/0107337 A1* | 8/2002 | Rosenzweig et al. ......... 525/474 |
| 2005/0048288 A1 | 3/2005 | Flynn |
| 2005/0070627 A1* | 3/2005 | Falsafi et al. ................... 523/115 |
| 2006/0069198 A1 | 3/2006 | Okuda |
| 2006/0293449 A1* | 12/2006 | Weberg et al. ................ 525/107 |
| 2008/0081286 A1* | 4/2008 | Watanabe et al. .......... 430/281.1 |
| 2008/0207825 A1 | 8/2008 | Stark |
| 2008/0315459 A1 | 12/2008 | Zhang |
| 2009/0030174 A1* | 1/2009 | Sogah et al. ................... 528/354 |
| 2010/0041822 A1 | 2/2010 | Hashemzadeh |

FOREIGN PATENT DOCUMENTS

| | | | |
|---|---|---|---|
| CN | 101490121 A | 7/2009 | |
| JP | 06-057206 | 3/1994 | |
| JP | 2008-284797 | 11/2008 | |
| WO | WO 0038619 A2 * | 7/2000 | ............... A61K 6/00 |

OTHER PUBLICATIONS

International Search Report for International Application No. PCT/US2011/058888 mailed on Jun. 5, 2012, 4 pages.
Kawakami, "Synthesis and Copolymerization of Polysiloxane Macromers" American Chemical Society, Apr. 1984, vol. 25, No. 1, pp. 245.
Kawakami, "Synthesis of silicone graft polymers and a study of their surface active properties", Makromol. Chem. 1985, vol. 185, pp. 9-18.
Noshay, "Block Copolymers: Overview and Critical Survey", Academic Press, New York, pp. 13-16, (1977).
Yamashita, "Synthesis of Amphiphilic Graftcopolymers from Polystyrene Macromonomer" Polymer Journal, 1982, vol. 14, No. 4, pp. 255-260.
Extended European Search Report for Application No. 11838720.8, dated Mar. 13, 2014, 3 pages.

* cited by examiner

*Primary Examiner* — Robert S Loewe

(57) ABSTRACT

A graft co-polymer is provided comprising a vinyl polymeric backbone with grafts of siloxane monomers and monomers containing an anchoring group. Such co-polymers are well suited for coating metal molds. The siloxane groups provide release to the metal mold, while the anchoring groups provide durability to the coating. The durability and release characteristics may be varied by the number of grafts of each monomer and the molecular weight of the siloxane moiety. The co-polymers may be coated from water or organic solvents.

20 Claims, No Drawings

SILOXANE GRAFT CO-POLYMERS FOR MOLD RELEASE

FIELD

This invention relates to siloxane graft co-polymers compositions for use as release coatings on metal molds.

BACKGROUND

Injection molding is a manufacturing process used to make polymeric articles. In its simplest form, a polymer is heated to a molten state and forced into a mold cavity where the polymer cools and hardens. The mold is then opened and the part removed.

Reaction injection molding (RIM) is a specific type of injection molding where the liquid introduced into the mold contains chemicals which react to form the polymer instead of the molten polymer itself being injected into the mold. A specific example of RIM is the introduction of an isocyanate and polyol which react in the mold to form a polyurethane. RIM presents special challenges in the injection molding process. Since the components are reactive and polymerize in the mold, it can be difficult for the part to be removed from the mold. The adhesion of the polymer to the metal surface can reduce the lifetime of molds, degrade the quality of the replication, and complicate the processing procedure. Increased time for the molding process, increased costs due to more frequent cleaning, and defective parts caused by poor release from the mold surface are examples of challenges from poor release. For these reasons, metal molds are often coated with a release agent in order to overcome the adhesion of the polymeric part to the metal surface.

Thermoforming is another manufacturing process that is used to make polymeric materials. In the thermoforming process, a plastic sheet or film is heated until it is pliable and is then formed into a desired shape in a mold. For example, a plastic sheet can be heated and then stretched into or onto a mold, cooled for a finished shape, and then trimmed to create the end product. Release of formed plastic parts from thermoforming molds can also be challenging. Thermoforming molds, like injection molding molds, are therefore often coated with release agents.

SUMMARY

The present invention provides durable compositions that enable good release of polymeric articles from molds (for example, metal molds used in traditional injection molding, RIM, thermoforming, and the like).

In a first aspect, a composition is provided comprising the reaction product of (A) an ethylenically unsaturated siloxane monomer and (B) an ethylenically unsaturated monomer containing an anchoring group.

In a second aspect, an aqueous composition is provided comprising the reaction product of (A) an ethylenically unsaturated siloxane monomer and (B) an ethylenically unsaturated monomer containing an acidic anchoring group, wherein the acidic groups have been neutralized with a volatile base.

In a third aspect, a method of making a composition is provided comprising the steps of reacting an ethylenically unsaturated siloxane monomer and an ethylenically unsaturated monomer containing an acidic anchoring group in a reaction solvent to form a co-polymer.

In a fourth aspect, a method of making a composition is provided comprising the steps of reacting an ethylenically unsaturated siloxane monomer and an ethylenically unsaturated monomer containing an acidic anchoring group in a reaction solvent to form a co-polymer, mixing the co-polymer with a volatile base to form a neutralized co-polymer, and mixing the neutralized co-polymer with water to form an aqueous coating mixture.

In a fifth aspect, a co-polymer is provided comprising
a vinyl polymeric backbone,
a monomer grafted thereto having the general formula 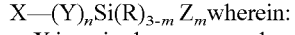 wherein:
X is a vinyl group co-polymerizable with other monomers;
Y is a divalent linking group;
n is zero or 1;
R is hydrogen, lower alkyl (for example, having from 1 to 6 carbon atoms), awl, or alkoxy;
m is an integer of from 1 to 3; and
Z is a monovalent siloxane polymeric moiety, and
a monomer containing an anchoring group grafted thereto.

In a sixth aspect, a method of coating a mold is provided comprising the steps of reacting an ethylenically unsaturated siloxane monomer and an ethylenically unsaturated monomer containing an acidic anchoring group in a reaction solvent to form a co-polymer, coating a mold with the co-polymer, and curing the coated co-polymer.

In a seventh aspect, a method of coating a mold is provided comprising the steps of reacting an ethylenically unsaturated siloxane monomer and an ethylenically unsaturated monomer containing an acidic anchoring group in a reaction solvent to form a co-polymer, mixing the co-polymer with a volatile base to form a neutralized co-polymer, mixing the neutralized co-polymer with water to form an aqueous coating mixture, coating a mold with the aqueous coating mixture, and curing the coated co-polymer.

In an eighth aspect, a method of making a composition is provided comprising the steps of reacting an ethylenically unsaturated siloxane monomer and an ethylenically unsaturated monomer containing a basic anchoring group in a reaction solvent to form a co-polymer, mixing the co-polymer with a volatile acid to form a neutralized co-polymer, and mixing the neutralized co-polymer with water to form an aqueous coating mixture.

In a ninth aspect, an aqueous composition is provided comprising the reaction product of an ethylenically unsaturated siloxane monomer and an ethylenically unsaturated monomer containing a basic anchoring group, wherein the basic groups have been neutralized with a volatile acid.

In a tenth aspect, a method of coating a mold is provided comprising the steps of reacting an ethylenically unsaturated siloxane monomer and an ethylenically unsaturated monomer containing a basic anchoring group in a reaction solvent to form a co-polymer, mixing the co-polymer with a volatile acid to form a neutralized co-polymer, mixing the neutralized co-polymer with water to form an aqueous coating mixture, coating a mold with the aqueous coating mixture, and curing the coated co-polymer.

DETAILED DESCRIPTION

The present compositions, when coated on the surface of metal molds (for example, copper or aluminum), provide release of polymeric articles from the molds. The compositions comprise co-polymers of repeating A, B, and optionally C monomers, wherein:
A is an ethylenically unsaturated monomer containing a siloxane polymeric moiety;
B is an ethylenically unsaturated monomer containing an anchoring group; and C is at least one ethylenically unsaturated monomer which modifies the characteristics of the co-polymer.

The co-polymers have a well-defined structure, comprising a vinyl polymeric backbone which has been chemically modified via the grafting of polymeric siloxane monomers and monomers containing an anchoring group. When such co-polymers are coated on a metal substrate, the siloxane grafts present a low energy, "siliconized" release surface, while the anchoring groups bond the co-polymer to the metal surface, providing durability to the release coating. The anchoring groups contain multiple binding sites capable of forming bonds or other attractive interactions with metal ions or metal surfaces. Alternatively, the anchoring groups may contain only a single binding site, but in concert with other anchoring groups, form multiple bonds or other attractive interactions with metal ions or metal surface. The release properties of the coating are determined by both the siloxane content of the co-polymer and the molecular weight of the siloxane polymeric moiety in Monomer A, with higher siloxane content and/or molecular weight providing easier release. The durability of the release coating is due, in part, to the interaction of the anchoring groups to the metal surface and the content of Monomer B in the co-polymer. The optional C monomer(s) comprise moieties which alter the properties of the co-polymer in solution or the coated co-polymer. The C monomer may increase solubility of the monomers or co-polymer in the reaction solvent, or improve stability of the co-polymer solution. The C monomer may also improve the release of the molded articles from the coated co-polymer, or improve the thermal stability or durability of the coated co-polymer. A graft co-polymer or co-polymer blend can, therefore, be chemically tailored to provide a specific level of release and durability which can be reproduced with consistency, and this makes possible the variation of the release properties of a metal mold over a range of values in a controlled fashion. Thus, by virtue of their chemical composition, structure, and the resultant properties, the co-polymers are uniquely well-suited to control the release in injection molding applications.

In one embodiment, Monomer A has the general formula:

$$X—(Y)_n Si(R)_{3-m} Z_m \text{ wherein:}$$

X is a vinyl group co-polymerizable with other monomers;
Y is a divalent linking group;
n is zero or 1;
R is hydrogen, lower alkyl, aryl, or alkoxy;
m is an integer of from 1 to 3; and
Z is a monovalent siloxane polymeric moiety.

Monomer A may be further defined as containing an X group of the general formula:

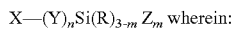

wherein $R^1$ is a hydrogen atom or a —COOH group and $R^2$ is a hydrogen atom, a methyl group, or a —CH$_2$COOH group. The Z group of Monomer A has the general formula

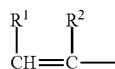

wherein $R^3$ and $R^5$ are independently alkyl groups having from one to six carbon atoms, fluoroalkyl groups having from one to six carbon atoms, phenol or substituted phenols. $R^4$ may be alkyl, alkoxy, alkylamino, aryl, hydroxyl, or fluoroalkyl, and r is an integer from about 5 to about 700. Monomer A may have a general formula selected from the group consisting of:

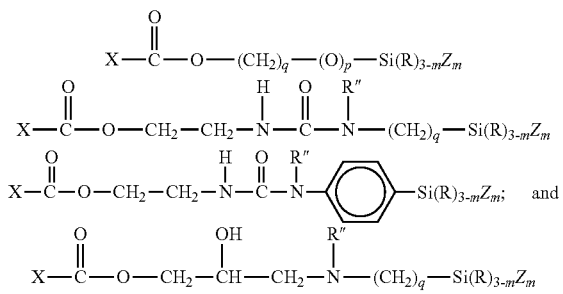

wherein q is an integer from 2 to 6;

p is 0 or 1;

R" is alkyl or halogen;

X, R, Z, and m are defined as above;

and

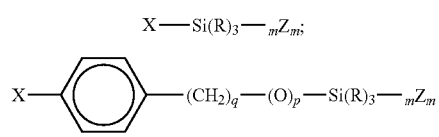

wherein q is 0, 1, or 2; and m, p, X, R, Z are defined as above.

Polymeric moiety Z is a monovalent siloxane having a number average molecular weight from about 1,000 or 5000 to an upper limit of about 25,000 or 50,000 and is essentially unreactive under co-polymerization conditions.

Monomer A is a terminally functional polymer having a single functional group (the vinyl group) and is sometimes termed a macromonomer or 'macromer'. Such monomers are known and may be prepared by the method disclosed by Milkovich et al., as described in U.S. Pat. Nos. 3,786,116 and 3,842,059. The preparation of polydimethylsiloxane macromonomer and subsequent co-polymerization with vinyl monomer have been described in several papers by Y. Yamashita et al., Polymer J. 14, 913 (1982); ACS Polymer Preprints 25 (1), 245 (1984); Makromol. Chem. 185, 9 (1984). This method of macromonomer preparation involves the anionic polymerization of hexamethylcyclotrisiloxane monomer (D3) to form living polymer of controlled molecular weight, and termination is achieved via chlorosilane compounds containing a polymerizable vinyl group. Free radical co-polymerization of the monofunctional siloxane macromonomer with vinyl monomer such as methyl methacrylate or styrene provides siloxane grafted co-polymer of well-defined structure, i.e., controlled length and number of grafted siloxane branches.

Suitable monomers for use in the above-mentioned anionic polymerization are, in general, diorganocyclosiloxanes of the formula:

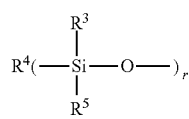

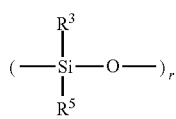

where $R^3$ and $R^5$ are as previously defined and where r is an integer of 3 to 7. Preferred are the cyclic siloxanes where r is 3 or 4 and $R^3$ and $R^5$ are both methyl, these cyclic siloxanes being hereafter designated D3 and D4, respectively. D3, which is a strained ring structure, is especially preferred.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are ethylsodium, propylsodium, phenylsodium, butylpotassium, octylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the formula:

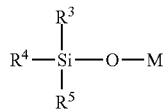

where M is alkali metal, tetraalkylammonium, or tetraalkylphosphonium cation and where $R^3$, $R^4$, and $R^5$ are as previously defined. The preferred triorganosilanolate initiator is lithium trimethylsilanolate (LTMS). In general, the preferred use of both strained cyclic monomer and lithium initiator reduces the likelihood of redistribution reactions and thereby provides siloxane macromonomer of narrow molecular weight distribution which is reasonably free of unwanted cyclic oligomers.

Molecular weight is determined by the initiator/cyclic monomer ratio, and thus the amount of initiator may vary from about 0.004 to about 0.2 mole of organometallic initiator per mole of monomer. Preferably, the amount will be from about 0.008 to about 0.04 mole of initiator per mole of monomer.

For the initiation of the anionic polymerization, an inert preferably polar organic solvent can be utilized. Anionic polymerization propagation with lithium counterion requires either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to 'activate' the silanolate ion, making propagation possible.

Generally, the polymerization can be carried out at a temperature ranging from about −20° C. or −10° C. to about 30° C. or 100° C. Anhydrous conditions and an inert atmosphere such as nitrogen, helium, or argon are required.

Termination of the anionic polymerization is, in general, achieved via direct reaction of the living polymeric anion with halogen-containing terminating agents, i.e., functionalized chlorosilanes, to produce vinyl terminated polymeric monomers. Such terminating agents may be represented by the general formula $X—(Y)_n—Si(R)_{3-m}Cl_m$, where m is 1, 2, or 3 and where X, Y, n, and R have been previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Y. Yamashita et al., the reaction mixture may be ultrasonically irradiated after addition of the terminating agent in order to enhance functionality of the macromonomer. Purification of the macromonomer can be effected by precipitation in methanol.

Monomer B contains a functional group which anchors the co-polymer to the surface of the mold. It provides durability to the coating, allowing more molding operations to be performed before re-applying the co-polymer to the mold surface. An example B monomer has the general formula:

$X—(Y)_n$-G wherein:

X and Y have been previously defined;
n is 0 or 1; and
G is an anchoring group.

G is a functional group which contains multiple binding sites capable of forming bonds or other attractive interactions with a metal ions or metal surfaces. Alternatively, the anchoring group may contain only a single binding site, but in concert with other functional groups, may form multiple bonds or other attractive interactions with metal ions or metal surface. Examples of useful anchoring groups include phosphate acids or esters, phosphonate acids or esters, and vinyl pyridines. Functional group G may be bonded directly to the vinyl group (n=0) or can be bonded through a linking group (n=1). Common linking groups include ethers, esters, and amides. Example Y groups are —COO(CH$_2$)$_2$— and —COO(CH$_2$)$_6$—. One example B monomer is hydroxyethylmethacrylate phosphate, which is commercially available from Esstech, Inc.

Optional Monomer C has the general formula:

$X—(Y)_n$-Q wherein:

X and Y are as defined above;
n is 0 or 1; and
Q is a group capable of modifying the properties of the final composition.

Modifying group Q may take many forms. For example, Q may be an ether or amine group which may improve the anchoring of the coated co-polymer to the mold. Examples include ethoxy and ethylamine. Group Q may also be a fluorinated moiety which provides oil repellency to the co-polymer and the coated mold surface. In addition, monomer C may contain a group which increases the solubility of the co-polymer in the 10 reaction solvent or delivery solvent such as 2-(2-ethoxyethoxy)ethyl acrylate. In other cases, monomer C may function only as a diluent—capable of extending the vinyl polymeric backbone while decreasing the amount of monomer A or B, thus decreasing the cost of the polymer. Examples include methyl acrylate and methyl methacrylate.

The co-polymerization of the A monomer, B monomer, and optional C monomer is by conventional free radical polymerization such as described by Ulrich, U.S. Pat. No. Re. 24,906. The monomers are dissolved in a reaction solvent comprising an inert organic solvent and polymerized utilizing a suitable free radical initiator which can be either thermally or photochemically activated. Such initiators include azo compounds such as 2,2'-azobis(isobutyronitrile), hydroperoxides such as tert-butyl hydroperoxide, and peroxides such as benzoyl peroxide or cyclohexanone peroxide. The amount of initiator used is generally about 0.01 to about 5% by weight of the total polymerizable composition.

The reaction solvent used in the free radical co-polymerization can be any organic liquid which is inert to the reactants and products and which will not otherwise adversely affect the reaction. Suitable solvents include ethyl acetate, toluene, heptanes, isopropyl alcohol, methyl alcohol, and methyl isobutylketone, or mixtures thereof. Other solvent systems may useful. The amount of solvent is generally about 30-80% by weight of the total weight of reactants and solvent. In addition to solution polymerization, the co-polymerization can be carried out by other well-known techniques such as suspension, emulsion, and bulk polymerization.

As described above, the preferred grafting technique involves co-polymerization of monomers A, B, and optionally C. Other grafting techniques can be employed, each providing a degree of predictability of the properties of the end product. One alternative technique involves preforming the vinyl polymeric backbone, then co-polymerizing this preformed backbone with the A, B, and optional C monomers. Another approach is to graft preformed monofunctional siloxane polymer to a preformed vinyl polymeric backbone. These and other polymer grafting techniques are described by Noshay and McGrath in Block Co-polymers, Academic Press, New York (1977), pages 13-16 and in greater detail by Battaerd and Tregear in Graft Co-polymers, J. Wiley and Sons, New York (1967).

When the above-described A, B, and, optional C monomers are co-polymerized and coated on a substrate, a release surface is obtained. The level of release is related to both the molecular weight of the siloxane polymeric moiety in Monomer A and its weight percentage in the co-polymer. Co-polymers containing a siloxane polymeric moiety having a molecular weight less than about 1,000 are not as effective as release coatings. Co-polymers containing a siloxane polymeric moiety with a molecular weight greater than 50,000 provide effective release coatings, but little increase in performance is noted by increasing the molecular weight beyond 50,000. Also, at very high molecular weights, e.g., in excess of about 50,000, possible incompatibility of Monomer A with the remaining monomer(s) during the co-polymerization reaction may result in reduced incorporation of A into the co-polymer. The preferred molecular weight range of the siloxane polymeric moiety of Monomer A is from about 1,000 or 5,000 to about 25,000 or 50,000.

Monomer A is incorporated into the co-polymer in an amount from about 25% to an upper limit of about 99% or 90% or 75% of the total co-polymer weight. The amount of A monomer included may vary depending upon the particular application. Incorporation of such percentages of A monomer having a molecular weight in the above-specified range has been found to proceed smoothly and to result in material which provides effective release.

Monomer B is incorporated in the co-polymer in the amount from about 0.5% or 2% or 5% to an upper limit of about 8% or 10% of the total co-polymer weight. As described above, Monomer B provides durability to the coated composition by bonding the co-polymer to the metal surface. The concentration of Monomer B is limited at the low end of the range by the required durability of the coating and at the higher end of the range by solubility of the resulting co-polymer in the reaction solvents.

Monomer C is incorporated in the co-polymer in the amount up to about 50% or 75%.

The described method of preparation of these release compositions provides graft co-polymers which can be coated directly from the polymerization solvent. Optionally, the co-polymer may be isolated from the reaction solvent and dissolved in a more suitable solvent. Additionally, the co-polymer may be inverted into water and coated without the need for an organic solvent. Coating these co-polymers from water is environmentally friendly and eliminates the use of volatile solvents.

To deliver these co-polymers from water, the anchoring monomer contains an acidic functional group such as phosphate. Neutralizing the acidic groups with a volatile base, such as an amine base, increases the water solubility of the co-polymer reaction product, permitting delivery of the co-polymer from water. The base is added in sufficient quantity to react with a majority of the acidic functional groups. Once neutralized, the co-polymer may be diluted with water to provide an aqueous solution. The volatility of the base must be high enough to allow the base to be removed during the coating curing process, thus freeing the acidic groups to anchor the composition to the mold surface. Curing may take place, for example, by heating the mold to 120° C. for 30 minutes.

Alternatively, the anchoring monomer may contain a basic functional group such as vinyl pyridines. In this case, the basic groups are neutralized with a volatile acid prior to water dilution.

The release coating compositions may be applied to mold surface by means of conventional coating techniques such as dip-coating and spray-coating.

Items

Item 1 is a composition comprising the reaction product of an ethylenically unsaturated siloxane monomer and an ethylenically unsaturated monomer containing an anchoring group.

Item 2 is the composition of item 1, wherein the anchoring group is selected from the group consisting of phosphates, phosphonates, and vinyl pyridines.

Item 3 is the composition of items 1 or 2, wherein the siloxane monomer has the general formula $X-(Y)_n Si(R)_{3-m} Z_m$, wherein:

X is a vinyl group;
Y is a divalent linking group;
n is zero or 1;
m is 1, 2, or 3;
Z is a polymeric siloxane moiety; and
R is hydrogen, lower alkyl, aryl, or alkoxy.

Item 4 is the composition of any one of items 1-3 wherein the siloxane monomer has the formula:

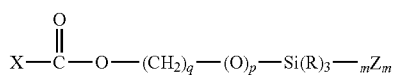

wherein:
m is 1, 2, or 3;
p is 0 or 1;
q is an integer between 2 and 6;
X is a vinyl group; and
Z is a polymeric siloxane moiety.

Item 5 is the composition of any one of items 1-4 wherein the ethylenically unsaturated monomer containing an anchoring group is hydroxyethylmethacrylate phosphate.

Item 6 is the composition of any one of items 1-5 wherein the ethylenically unsaturated monomer containing an anchoring group is present at a concentration of 0.5%-10% of the total polymer weight.

Item 7 is the composition of any one of items 1-6 wherein the ethylenically unsaturated monomer containing an anchoring group is present at a concentration of 2%-10% of the total polymer weight.

Item 8 is the composition of any one of items 1-7 wherein the ethylenically unsaturated monomer containing an anchoring group is present at a concentration of 5%-8% of the total polymer weight.

Item 9 is the composition of any one of items 1-8 wherein the siloxane monomer is present at a concentration of 25%-99% of the total polymer weight.

Item 10 is the composition of any one of items 1-9 wherein the siloxane monomer is present at a concentration of 25%-90% of the total polymer weight.

Item 11 is the composition of any one of items 1-10 wherein the siloxane monomer is present at a concentration of 25%-75% of the total polymer weight.

Item 12 is an aqueous composition comprising the reaction product of an ethylenically unsaturated siloxane monomer and an ethylenically unsaturated monomer containing an acidic anchoring group, wherein the acidic groups have been neutralized with a volatile base.

Item 13 is the composition of item 12 wherein the acidic anchoring group is selected from the group consisting of phosphates and phosphonates.

Item 14 is the composition of items 12 or 13 wherein the siloxane monomer has the general formula $X-(Y)_n-Si(R)_{3-m}Z_m$, wherein:
X is a vinyl group;
Y is a divalent linking group;
n is zero or 1;
m is 1, 2, or 3;
Z is a polymeric siloxane moiety; and
R is hydrogen, lower alkyl, aryl, or alkoxy.

Item 15 is the composition of any one of items 12-14 wherein the siloxane monomer has the formula:

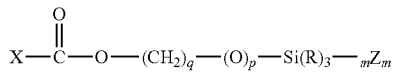

wherein:
m is 1, 2, or 3;
p is 0 or 1;
q is an integer between 2 and 6;
X is a vinyl group; and
Z is a polymeric siloxane moiety.

Item 16 is the composition of any one of items 12-15 wherein the ethylenically unsaturated monomer containing an acidic anchoring group is hydroxyethylmethacrylate phosphate.

Item 17 is the composition of any one of items 12-16 wherein the ethylenically unsaturated monomer containing an acidic anchoring group is present at a concentration of 0.5%-10% of the total polymer weight.

Item 18 is the composition of any one of items 12-17 wherein the ethylenically unsaturated monomer containing an acidic anchoring group is present at a concentration of 2%-10% of the total polymer weight.

Item 19 is the composition of any one of items 12-18 wherein the ethylenically unsaturated monomer containing an acidic anchoring group is present at a concentration of 5%-8% of the total polymer weight.

Item 20 is the composition of any one of items 12-19 wherein the siloxane monomer is present at a concentration of 25%-99% of the total polymer weight.

Item 21 is the composition of any one of items 12-20 wherein the siloxane monomer is present at a concentration of 25%-90% of the total polymer weight.

Item 22 is the composition of any one of items 12-21 wherein the siloxane monomer is present at a concentration of 25%-75% of the total polymer weight.

Item 23 is the composition of any one of items 1-22 further comprising an ethylenically unsaturated fluorinated monomer.

Item 24 is the composition of any one of items 1-22 further comprising an ethylenically unsaturated non-fluorinated monomer.

Item 25 is method of making a composition comprising the steps of: reacting an ethylenically unsaturated siloxane monomer and an ethylenically unsaturated monomer containing an acidic anchoring group in a reaction solvent to form a co-polymer.

Item 26 is a method of making a composition comprising the steps of: reacting an ethylenically unsaturated siloxane monomer and an ethylenically unsaturated monomer containing an acidic anchoring group in a reaction solvent to form a co-polymer; mixing the co-polymer with a volatile base to form a neutralized co-polymer; and mixing the neutralized co-polymer with water to form an aqueous coating mixture.

Item 27 is a metal mold coated with the composition of any one of Items 1-24.

Item 28 is a co-polymer comprising:
a vinyl polymeric backbone;
a monomer grafted thereto having the general formula $X-(Y)_nSi(R)_{3-m}Z_m$ wherein:
X is a vinyl group co-polymerizable with other monomers;
Y is a divalent linking group;
n is zero or 1;
R is hydrogen, lower alkyl, aryl, or alkoxy;
m is an integer of from 1 to 3;
Z is a monovalent siloxane polymeric moiety; and
a monomer containing an anchoring group grafted thereto.

Item 29 is a method of coating a mold comprising the steps of:
reacting an ethylenically unsaturated siloxane monomer and an ethylenically unsaturated monomer containing an acidic anchoring group in a reaction solvent to form a co-polymer;
coating a mold with the co-polymer; and
curing the coated co-polymer.

Item 30 is a method of coating a mold comprising the steps of:
reacting an ethylenically unsaturated siloxane monomer and an ethylenically unsaturated monomer containing an acidic anchoring group in a reaction solvent to form a co-polymer;
mixing the co-polymer with a volatile base to form a neutralized co-polymer;
mixing the neutralized co-polymer with water to form an aqueous coating mixture;
coating a mold with the aqueous coating mixture; and
curing the coated co-polymer.

Item 31 is a method of making a composition comprising the steps of:
reacting an ethylenically unsaturated siloxane monomer and an ethylenically unsaturated monomer containing a basic anchoring group in a reaction solvent to form a co-polymer;
mixing the co-polymer with a volatile acid to form a neutralized co-polymer; and
mixing the neutralized co-polymer with water to form an aqueous coating mixture.

Item 32 is an aqueous composition comprising the reaction product of an ethylenically unsaturated siloxane monomer and an ethylenically unsaturated monomer containing a basic anchoring group, wherein the acidic groups have been neutralized with a volatile acid.

Item 33 is a method of coating a mold comprising the steps of:
reacting an ethylenically unsaturated siloxane monomer and an ethylenically unsaturated monomer containing a basic anchoring group in a reaction solvent to form a co-polymer;
mixing the co-polymer with a volatile acid to form a neutralized co-polymer;
mixing the neutralized co-polymer with water to form an aqueous coating mixture;
coating a mold with the aqueous coating mixture; and
curing the coated co-polymer.

Item 34 is the composition of item 32 wherein the basic anchoring group is selected from the group consisting of vinyl pyridines.

Item 35 is the method of item 31 or 33 wherein the basic anchoring group is selected from the group consisting of vinyl pyridines.

EXAMPLES

Materials

A list of compounds utilized in the examples shown in Table 1.

Coating Process

Polished aluminum plates were either dip-coated (five minute dip time) or sprayed (two sprays from 15 cm) with the coating mixtures, and then rinsed with IPA. The plates were thermally cured at 120° C. for 30 minutes and allowed to cool to room temperature prior to testing.

Test Methods

Release Test

Samples of fibrowood/polyurethane laminates (5 cm×5 cm) were placed on the coated aluminum plates, polyurethane surface against the coated aluminum. Three sets of aluminum plates/laminate were stacked and placed in a press. A pressure of 4.5 metric tons was applied for 15 seconds, followed by a pressure release for 3 seconds. The pressure and release operation was repeated twice more for a total of three presses. The pressure release steps were included to allow moisture to escape which helps ensure a bubble-free laminate Immediately after the final press, the samples were visually evaluated for polyurethane release.

Peel Test

Scotch™ adhesive tape (cat. #8403) was laminated to the coated sided of an aluminum test plate. The plate was placed on the stage of an Intrumentors, Inc. slip/peel tester, Model 3M90, equipped with a 5 kg load cell. Peel was tested at 229 cm/minute and an angle of 180°. The peel force was averaged over 2 seconds.

Co-Polymer Synthesis

To a glass bottle was added the monomers as shown in Table 2. To this was added 35 grams toluene, 5 grams IPA, and 0.15 grams of the initiator, Vazo-67. The dissolved oxygen was removed by passing nitrogen through the mixture for 10 min This bottle was placed in a launder-o-meter at 65° C. for 15 hours.

The weight % of the phosphate monomer in the polymer had a significant effect in keeping the polymer in solution. As shown in Table 2, increasing the amount of phosphate monomer results in polymer precipitation with the toluene/IPA reaction solvent.

TABLE 1

Materials List

| Compound | CAS # | Source | Chemical |
|---|---|---|---|
| Silicon MA (Si-MA) | | 3M Company, St. Paul, MN | $H_3C-C(=O)-O-CH_2-CH_2-CH_2-Si(CH_3)_2-[O-Si(CH_3)_2]_n-O-Si(CH_3)_2-CH_2-CH_2-CH_3$ with $CH_2=$ |
| CD-9050 | 7328-17-8 | SARTOMER, Warrington, PA | 2-(2-Ethoxyethoxy)Ethyl Acrylate (EOEOEA)/HEMA-P blend |
| HEMA-P | 24599-21-1 | ESSTECH, Inc, Essington, PA | Hydroxyethylmethacrylate phosphate |
| MAA | 79-41-4 | Sigma-Aldrich, St. Louis, MO | Methacrylic acid |
| Toluene | 108-88-3 | VWR, West Chester, PA | Toluene |
| IPA | 67-63-0 | VWR, West Chester, PA | Isopropyl alcohol |
| MIBK | 108-10-1 | VWR, West Chester, PA | Methyl isobutyl ketone |
| KF6003 | 70131-67-8 | Shin-Etsu, Japan | Polydimethyl siloxane diol, MW 2550 |
| Phosphoric Acid | 7664-38-2 | Sigma-Aldrich, St. Louis, MO | $H_3PO_4$ |
| MIBK | 108-10-1 | VWR, West Chester, PA | Methyl isobutyl ketone |
| Vazo-67 | 13472-08-7 | DuPont Inc., Willimgton, DE | 2,2'-Azobis(2-methylbutyronitrile) |

TABLE 2

Co-polymer Mixtures

| Mixture | Monomer A[a] grams (wt. %) | Monomer B[b] grams (wt. %) | Monomer C grams (wt. %) | Mixture Appearance |
|---|---|---|---|---|
| M-1 | 25 (100%) | 0 | 0 | Clear |
| M-2 | 24.75 (99%) | 0.125 (0.5%) | 0.125 (0.5%) [c] | Clear |
| M-3 | 23.75 (95%) | 0.625 (2.5%) | 0.625 (2.5%) [c] | Clear |
| M-4 | 22.5 (90%) | 1.25 (5%) | 1.25 (5%) [c] | Cloudy |

TABLE 2-continued

Co-polymer Mixtures

| Mixture | Monomer A[a] grams (wt. %) | Monomer B[b] grams (wt. %) | Monomer C grams (wt. %) | Mixture Appearance |
|---|---|---|---|---|
| M-5 | 20 (80%) | 2.5 (10%) | 2.5 (10%) [c] | Significant Precipitate |
| M-6 | 22.5 (90%) | 0 | 2.5 (10%) [d] | Gelled |
| M-7 | 23.75 (95%) | 1.25 (5%) | 0 | Clear |
| M-8 | 23 (92%) | 2.0 (8%) | 0 | Cloudy |

[a] Silicon MA
[b] HEMA-P
[c] EOEOEA
[d] MAA

EXAMPLES

Due to the precipitation observed with the higher concentrations of phosphate monomer, M-5 was not evaluated further. Monomer mixtures M-2 through M4, M7, and M8 were diluted in MIBK at room temperature in a brown glass container and mixed well prior to use.

Comparatives

Alternate B Monomer

M-6 contained MAA as monomer B instead of phosphate. As shown in Table 2, the polymer prepared with MAA gelled in the reaction solvent and could not be utilized in further testing.

Polydimethylsiloxane Diphosphate (C-1 to C-3)

Comparatives 1 through 3 contain siloxane in the backbone, not pendant as in the examples.

To a round bottom flask were added 50 grams KF6003, 25 grams phosphoric acid, and 50 grams toluene. This mixture was heated for 6 hours at 90° C. The solution was allowed to cool to ambient temperature upon which two layers formed. The top layer was decanted and washed three times with 50 ml of water. The toluene was evaporated under reduced pressure. A viscous polydimethylsiloxane diphosphate polymer remained which was utilized as a comparative polymer.

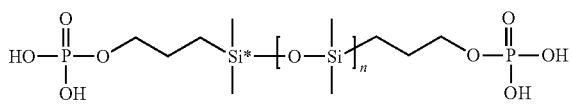

Wax (C-4)

Meguiar's® M85-Diamond Cut Compound 2.0 is a polishing agent consisting of diethylene glycol ether, medium aliphatic naphtha, isoparaffinic hydrocarbons, aluminum oxide, glycerine and water.

Mixtures Containing No Phosphate Monomer (C5-C7)

Monomer mixture M-1 contains Silicone-MA, but no phosphate monomer, therefore all formulations prepared with M-1 are comparative examples.

TABLE 3

Example (E) and Comparative (C) Formulations in MIBK

| Formulation Number | Co-polymer Mixture | Total Co-polymer (wt. %) |
|---|---|---|
| E-1 | M-2 | 10 |
| E-2 | M-3 | 10 |
| E-3 | M-4 | 10 |
| E-4 | M-7 | 10 |
| E-5 | M-8 | 10 |
| E-6 | M-2 | 0.5 |
| E-7 | M-3 | 0.5 |
| E-8 | M-4 | 0.5 |
| E-9 | M-7 | 0.5 |
| E-10 | M-8 | 0.5 |
| E-11 | M-2 | 1 |
| E-12 | M-3 | 1 |
| E-13 | M-4 | 1 |
| E-14 | M-7 | 1 |
| E-15 | M-8 | 1 |
| C-1 | Polydimethylsiloxane Diphosphate | 10 |
| C-2 | Polydimethylsiloxane Diphosphate | 1 |
| C-3 | Polydimethylsiloxane Diphosphate | 0.5 |
| C-4 | Meguiar's ® M85-Diamond Cut Compound 2.0 | Neat |
| C-5 | M-1 | 10 |
| C-6 | M-1 | 0.5 |
| C-7 | M-1 | 1 |

TABLE 4

Release Performance of Polyurethane-Fibrowood From Coated Al-Plates

| Formulation Number | Release Performance[a] | | | | |
|---|---|---|---|---|---|
| | Trial 1 | Trial 2 | Trial 3 | Trial 4 | Trial 5 |
| E-1 | 1 | 2 | 3 | 5 | —[b] |
| E-2 | 1 | 1 | 1 | 1 | 2 |
| E-3 | 1 | 1 | 1 | 1 | 1 |
| E-4 | 1 | 1 | 1 | 1 | 1 |
| E-5 | 1 | 1 | 1 | 1 | 1 |
| E-6 | 5 | — | — | — | — |
| E-7 | 5 | — | — | — | — |
| E-8 | 5 | — | — | — | — |
| E-9 | 5 | — | — | — | — |
| E-10 | 5 | — | — | — | — |
| E-11 | 5 | — | — | — | — |
| E-12 | 5 | — | — | — | — |
| E-13 | 1 | 4 | 5 | — | — |
| E-14 | 4 | 4 | 5 | — | — |
| E-15 | 5 | — | — | — | — |
| C-1 | 5 | — | — | — | — |
| C-2 | 5 | — | — | — | — |
| C-3 | 5 | — | — | — | — |
| C-4 | 5 | — | — | — | — |
| C-5 | 5 | — | — | — | — |
| C-6 | 5 | — | — | — | — |
| C-7 | 5 | — | — | — | — |

[a] 1—Very Easy to Release/Falls off from the Al substrate
2—Does not fall of, but can be taken off with hand with no pressure
3—Can be taken off with hand with some pressure
4—Can be taken off with hand with more pressure
5—Not able to release from the surface.
[b] Not tested Peel force measurements were taken after visually assessing the polyurethane mold release. Results of the peel test are shown in Table 5.

TABLE 5

| Formulation | Peel Force (grams/2.54 cm) | | |
|---|---|---|---|
| Number | Maximum | Minimum | Average |
| E-1 | 125 | 63 | 132 |
| E-2 | 62 | 25 | 41 |
| E-3 | 86 | 34 | 55 |
| E-4 | 125 | 21 | 48 |
| E-5 | 85 | 44 | 53 |
| E-8 | 391 | 112 | 194 |
| E-9 | 224 | 31 | 58 |
| E-10 | 339 | 46 | 113 |
| E-12 | 406 | 78 | 201 |
| E-15 | 310 | 36 | 92 |
| Control[a] | 805 | 555 | 706 |

[a]Uncoated aluminum used as control

While this invention has been described in terms of specific embodiments, it should be understood that it is capable of further modification. The claims herein are intended to cover those variations which one skilled in the art would recognize as the chemical equivalent of what has been described here. Other potential uses include release liners, concrete sealers, and hydrophobic coatings to repel water based liquids for easy clean applications.

The invention claimed is:

1. A composition comprising the reaction product of (A) an ethylenically unsaturated siloxane monomer and (B) hydroxyethylmethacrylate phosphate, wherein the hydroxyethylmethacrylate phosphate is present at a concentration of 5%-8% of the total polymer weight.

2. The composition of claim 1, wherein the siloxane monomer has the general formula $X-(Y)_n Si(R)_{3-m} Z_m$, wherein:
   X is a vinyl group;
   Y is a divalent linking group;
   n is zero or 1;
   m is 1, 2, or 3;
   Z is a polymeric siloxane moiety; and
   R is hydrogen, lower alkyl, aryl, or alkoxy.

3. The composition of claim 2 wherein the siloxane monomer has the formula:

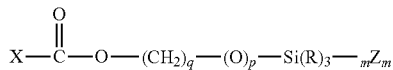

wherein:
   m is 1, 2, or 3;
   p is 0 or 1;
   q is an integer between 2 and 6;
   X is a vinyl group;
   Z is a polymeric siloxane moiety; and
   R is hydrogen, lower alkyl, aryl, or alkoxy.

4. The composition of claim 1 wherein the siloxane monomer is present at a concentration of 25%-99% of the total polymer weight.

5. The composition of claim 4 wherein the siloxane monomer is present at a concentration of 25%-90% of the total polymer weight.

6. The composition of claim 5 wherein the siloxane monomer is present at a concentration of 25%-75% of the total polymer weight.

7. The composition of claim 1 comprising reaction product of (A), (B), and (C) an ethylenically unsaturated fluorinated monomer.

8. The composition of claim 1 comprising the reaction product of (A), (B), and (C) an ethylenically unsaturated non-fluorinated monomer.

9. A metal mold coated with the composition of claim 1.

10. The composition of claim 1, wherein the siloxane monomer has the formula:

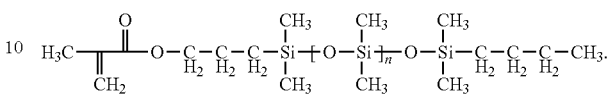

11. An aqueous composition comprising the reaction product of an ethylenically unsaturated siloxane monomer and hydroxyethylmethacrylate phosphate, wherein the hydroxyethylmethacrylate phosphate has been neutralized with a volatile base, and wherein the hydroxyethylmethacrylate phosphate is present at a concentration of 5%-8% of the total polymer weight.

12. The composition of claim 11 wherein the siloxane monomer has the general formula $X-(Y)_n Si(R)_{3-m} Z_m$, wherein:
   X is a vinyl group;
   Y is a divalent linking group;
   n is zero or 1;
   m is 1, 2, or 3;
   Z is a polymeric siloxane moiety; and
   R is hydrogen, lower alkyl, aryl, or alkoxy.

13. The composition of claim 12 wherein the siloxane monomer has the formula:

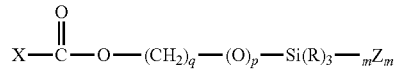

wherein:
   m is 1, 2, or 3;
   p is 0 or 1;
   q is an integer between 2 and 6;
   X is a vinyl group;
   Z is a polymeric siloxane moiety; and
   R is hydrogen, lower alkyl, aryl, or alkoxy.

14. The composition of claim 11 wherein the siloxane monomer is present at a concentration of 25%-99% of the total polymer weight.

15. The composition of claim 14 wherein the siloxane monomer is present at a concentration of 25%-90% of the total polymer weight.

16. The composition of claim 15 wherein the siloxane monomer is present at a concentration of 25%-75% of the total polymer weight.

17. A method of making a composition comprising:
   reacting an ethylenically unsaturated siloxane monomer and hydroxyethylmethacrylate phosphate in a reaction solvent to form a co-polymer, wherein the hydroxyethylmethacrylate phosphate is present at a concentration of 5%-8% of the total polymer weight.

18. A method of coating a mold comprising:
   reacting an ethylenically unsaturated siloxane monomer and hydroxyethylmethacrylate phosphate in a reaction solvent to form a co-polymer, wherein the hydroxyethylmethacrylate phosphate is present at a concentration of 5%-8% of the total polymer weight;
   coating a mold with the co-polymer; and
   curing the coated co-polymer.

19. The method of coating a mold of claim 18, the method comprising:
- reacting an ethylenically unsaturated siloxane monomer and hydroxyethylmethacrylate phosphate in a reaction solvent to form a co-polymer;
- mixing the co-polymer with a volatile base to form a neutralized co-polymer;
- mixing the neutralized co-polymer with water to form an aqueous coating mixture;
- coating a mold with the aqueous coating mixture; and
- curing the coated co-polymer.

20. The method of coating a mold of claim 18, the method comprising:
- reacting an ethylenically unsaturated siloxane monomer and an ethylenically unsaturated monomer containing a basic vinyl pyridine anchoring group in a reaction solvent to form a co-polymer;
- mixing the co-polymer with a volatile acid to form a neutralized co-polymer;
- mixing the neutralized co-polymer with water to form an aqueous coating mixture;
- coating a mold with the aqueous coating mixture; and
- curing the coated co-polymer.

* * * * *